United States Patent
Cho et al.

(10) Patent No.: US 9,582,928 B2
(45) Date of Patent: Feb. 28, 2017

(54) MULTI-VIEW RENDERING APPARATUS AND METHOD USING BACKGROUND PIXEL EXPANSION AND BACKGROUND-FIRST PATCH MATCHING

(75) Inventors: Yang Ho Cho, Hwaseong-si (KR); Du Sik Park, Suwon-si (KR); Ho Young Lee, Suwon-si (KR); Kyu Young Hwang, Hwaseong-si (KR); Young Ju Jeong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 984 days.

(21) Appl. No.: 13/349,115

(22) Filed: Jan. 12, 2012

(65) Prior Publication Data
US 2012/0212480 A1    Aug. 23, 2012

(30) Foreign Application Priority Data

Jan. 13, 2011 (KR) .................. 10-2011-0003658
Dec. 26, 2011 (KR) .................. 10-2011-0142432

(51) Int. Cl.
G06T 15/20    (2011.01)

(52) U.S. Cl.
CPC .................. G06T 15/205 (2013.01)

(58) Field of Classification Search
CPC .................................................. G06T 15/205
See application file for complete search history.

(56) References Cited

U.S. PATENT DOCUMENTS

| | | | |
|---|---|---|---|
| 7,362,799 B1 * | 4/2008 | Petrus | 375/224 |
| 2005/0174346 A1 | 8/2005 | Park et al. | |
| 2006/0140452 A1 * | 6/2006 | Raynor et al. | 382/115 |
| 2006/0215903 A1 * | 9/2006 | Nishiyama | G06K 9/32 382/154 |
| 2006/0257042 A1 | 11/2006 | Ofek et al. | |
| 2007/0098293 A1 * | 5/2007 | Xu et al. | 382/264 |
| 2010/0238160 A1 | 9/2010 | Yea et al. | |
| 2011/0261050 A1 * | 10/2011 | Smolic et al. | 345/419 |

FOREIGN PATENT DOCUMENTS

| | | |
|---|---|---|
| EP | 1 492 051 A2 | 12/2004 |
| EP | 1 950 700 A1 | 7/2008 |
| JP | 2009-533778 | 9/2009 |
| JP | 2012-120109 A | 6/2012 |
| KR | 10-2005-0061550 | 6/2005 |
| KR | 10-2007-0042288 | 4/2007 |
| KR | 10-2009-0068980 | 6/2009 |
| KR | 10-2010-0008649 | 1/2010 |
| KR | 10-2010-0008677 | 1/2010 |

(Continued)

OTHER PUBLICATIONS

Zhang, Liang, and Wa James Tam. "Stereoscopic image generation based on depth images for 3D TV." Broadcasting, IEEE Transactions on 51.2 (2005): 191-199.*

(Continued)

*Primary Examiner* — Zhengxi Liu
(74) *Attorney, Agent, or Firm* — NSIP Law

(57) ABSTRACT

An apparatus and method for restoring a hole generated in multi-view rendering are provided. A hole in an output view may be restored using temporally neighboring images.

21 Claims, 13 Drawing Sheets
(5 of 13 Drawing Sheet(s) Filed in Color)

(56) References Cited

FOREIGN PATENT DOCUMENTS

| KR | 10-2010-0088774 | 8/2010 |
| WO | WO 2010/037512 A | 4/2010 |
| WO | WO 2011/096252 A1 | 8/2011 |

OTHER PUBLICATIONS

Gunnewiek, R. Klein, et al. "Coherent spatial and temporal occlusion generation." IS&T/SPIE Electronic Imaging. International Society for Optics and Photonics, 2009.*

Vázquez, Carlos, Wa James Tam, and Filippo Speranza. "Stereoscopic imaging: filling disoccluded areas in depth image-based rendering." Optics East 2006. International Society for Optics and Photonics, 2006.*

Rane, Shantanu D., Guillermo Sapiro, and Marcelo Bertalmio. "Structure and texture filling-in of missing image blocks in wireless transmission and compression applications." Image Processing, IEEE Transactions on 12.3 (2003): 296-303.*

International Search Report issued Sep. 26, 2012 in corresponding International Patent Application PCT/KR2012/000299.

Extended European Search Report issued Oct. 4, 2013 in corresponding European Application No. 12151022.6.

Pérez, P. et al., "Poisson image editing." *ACM Transactions on Graphics (TOG)* vol. 22, No. 3, Jul. 1, 2003, pp. 313-318.

Luo, An-Chun, et al., "Occlusion size aware multi-viewpoint images generation from 2D plus depth images." *SPIE PROCECINGS*, International Society for Optics and Photonics, 2010, pp. 75241N-75241N.

Xu, Y. et al., "H. 264 Video Communication Based Refined Error Concealment Schemes," IEEE Transactions on Consumer Electronics, vol. 50 No. 4, Jun. 25, 2004 (pp. 1135-1141).

Wang, L. et al, "Stereoscopic Inpainting: Joint Color and Depth Completion from Stereo Images," IEEE Conference on Computer Vision and Pattern Recognition, 2008 (8 pages).

Alessandrini, D. et al., "Efficient and automatic stereoscopic videos to N views conversion for autostereoscopic displays," IS&T/SPIE Electronic Imaging, International Society for Optics and Photonics, 2009 (12 pages).

Koppel, M., et al. "Temporally consistent handling of disocclusions with texture synthesis for depth-image-based rendering," Proceedings of the 17th IEEE International Conference on Image Processing (ICIP), pp. 1809-1812, conference held on Sep. 26-29 in Hong Kong.

Hervieu, A., et al, "Stereoscopic Image Inpainting: Distinct Depth Maps and Images Inpainting," ICPR, 2010, (pp. 4101-4104).

Rhee, S. et al., "Accurate stereo view synthesis for an autostereoscopic 3D display," International Conference on Consumer Electronics (ICCE), 2010 IEEE Digest of Technical Papers, 2010 (2 pages).

Extended European Search Report issued on Apr. 26, 2012 in European Application No. 121510226.6 (9 pages).

European Office Action issued on Jan. 30, 2015 in European Application No. 12151022.6 (13 pages).

Vázquez, C. et al. "Stereoscopic imaging: filling disoccluded areas in depth image-based rendering." *Optics East 2006*. International Society Optics and Photonics, 2006, pp. 1-13.

Gunnewiek, R. Klein, et al. "Coherent spatial and temporal occlusion generation." *IS&T/SPIE Electronic Imaging*. International Society for Optics and Photonics, 2009, pp. 1-11.

Köppel, Martin, et al. "Temporally consistent handling of disocclusions with texture synthesis for depth-image-based rendering." *Image Processing (ICIP)*, 2010 17th *IEEE International Conference on*. IEEE, 2010, pp. 1-4.

Chinese Office Action issued by the Chinese Patent Office on Jul. 3, 2015 for the corresponding CN Patent Application No. 201280001829.2, 37 pages in English, 28 pages Chinese.

Japanese Office Action issued on Feb. 9, 2016 in counterpart Japanese Patent Application No. 2013-549367 (9 pages, with English translation).

* cited by examiner

MULTI-VIEW RENDERING APPARATUS AND METHOD USING BACKGROUND PIXEL EXPANSION AND BACKGROUND-FIRST PATCH MATCHING

CROSS-REFERENCE TO RELATED APPLICATIONS

This application claims the benefit of Korean Patent Application No. 10-2011-0003658 and 10-2011-0142432, filed on Jan. 13, 2011 and Dec. 26, 2011, respectively, in the Korean Intellectual Property Office, the disclosure of which is incorporated herein by reference.

BACKGROUND

1. Field

One or more example embodiments of the following description relate to a multi-view rendering apparatus and method.

2. Description of the Related Art

To generate a three-dimensional (3D) image, multi-view 3D images with a wide view, angles need to be consecutively represented.

However, it is difficult to individually capture multi-view images, and to transmit the captured multi-view images in real-time, due to difficulty in storage and transmission of photographed data, in addition to physical limitations in a photography system.

Accordingly, a 3D image generation apparatus may generate a 3D image using only a small number of input views (or reference views), for example two or three input views. Additionally, a 3D display apparatus for playing back the generated 3D image may generate multiple output views by interpolating or extrapolating the input views.

SUMMARY

According to example embodiments, there may be provided an apparatus and method for restoring a hole that is generated by image warping in an output view image.

The foregoing and/or other aspects are achieved by providing an image processing apparatus including a processor to control one or more processor-executable units, an image warping unit to generate an output view image by a image warping using a reference view image, and binocular disparity information of the reference view image, and a neighboring image-based hole restoration unit to restore a hole generated by the image warping using one or more temporally neighboring images.

The one or more temporally neighboring images may be temporally adjacent to the reference view image.

The one or more temporally neighboring images may be temporally adjacent to the output view image.

The neighboring image-based hole restoration unit may restore a pixel in the hole, using color values of pixels that are included in the temporally neighboring images and correspond to the first pixel.

When all of the reference view image and the temporally neighboring images are moved over time, the neighboring image-based hole restoration unit may select the pixels corresponding to the pixel in the hole from the temporally neighboring images, based on a movement of the reference view image and the temporally neighboring images.

The neighboring image-based hole restoration unit may restore the hole, using a pixel obtained by excluding one or more hole pixels corresponding to the pixel in the hole.

The neighboring image-based hole restoration unit may restore the hole, using a background pixel among pixels corresponding to the pixel in the hole.

The image processing apparatus may further include a buffer zone setting unit to expand the hole.

The buffer zone setting unit may expand the hole by regarding a buffer region adjacent to the hole as the hole. When the pixel in the hole is included in the buffer region, the neighboring image-based hole restoration unit may restore the pixel in the hole based on a color value of the pixel in the hole.

The image processing apparatus may further include a binocular disparity crack detection unit to set, as the hole, a crack in the output view image.

When a total sum of differences in a binocular disparity value between a pixel and neighboring pixels is greater than a predetermined value, the binocular disparity crack detection unit may detect the pixel as a crack.

The foregoing and/or other aspects are also achieved by providing an image processing apparatus including a processor to control one or more processor-executable units, an image warping unit to generate an output view image by an image warping using a reference view image, and binocular disparity information of the reference view image, and a neighboring pixel scaling-based hole restoration unit to restore a hole by scaling at least one pixel, the hole being generated by the image warping, and the at least one pixel being adjacent to the hole.

The neighboring pixel scaling-based hole restoration unit may perform scaling on a background pixel among the at least one pixel.

The at least one pixel, and at least one hole pixel of the hole may be on a same horizontal line.

The neighboring pixel scaling-based hole restoration unit may perform scaling on the at least one pixel in a direction perpendicular to a gradient of a background pixel among the at least one pixel adjacent to the hole.

The foregoing and/or other aspects are also achieved by providing an image processing apparatus including a processor to control one or more processor-executable units, an image warping unit to generate an output view image by an image warping using a reference view image, and binocular disparity information of the reference view image, and an optimal patch search-based hole restoration unit to locate a patch from a background, and to restore the hole using the located patch, the hole being generated by the image warping, and the patch being most similar to a region including the hole.

The region including the hole may include a hole region and a background region, and the optimal patch search-based hole restoration unit may restore the hole using a portion of the found patch that corresponds to the hole region.

The optimal patch search-based hole restoration unit may search for a first patch for a first region of the output view image, and a second patch for a second region of the output view image, and may restore an overlapping hole region between the first region and the second region using an average value of the first patch and the second patch.

The foregoing and/or other aspects are achieved by providing an image processing method including generating, by way of a processor, an output view image by image warping a reference view image, and based on binocular disparity information of the reference view image, and restoring a hole generated in the output view image using one or more temporally neighboring images.

The image processing method may further include expanding the hole.

The image processing method may further include setting, as the hole, a crack in the output view image.

The image processing method may further include restoring the hole by scaling at least one pixel, the at least one pixel being adjacent to hole.

The image processing method may further include restoring the hole by searching for a patch from a background, and using the found patch, the patch being most similar to a region including the hole.

The foregoing and/or other aspects are achieved by providing an apparatus for generating multi-views. The apparatus includes a processor to control one or more processor-executable units, an image generating unit to generate an output view image based on a reference view image and binocular disparity information of the reference view image, and a neighboring image-based hole restoration unit to restore a hole in the generated output view image using background information of one or more temporally neighboring images, the hole being generated as a result of the generating of the output view image.

The foregoing and/or other aspects are achieved by providing an apparatus for generating multi-views. The apparatus includes a processor to control one or more processor-executable units, an image generating unit to generate an output view image based on at least one reference view image, a binocular disparity crack detection unit to detect a crack in a predetermined object of the generated output view image, the predetermined object having different binocular disparity values allocated to different portions of the predetermined object, wherein the crack occurs in the predetermined object due to the generating of the output view image based on the at least one reference view image, and a multi-view generating unit to reassign the crack as a hole and to restore the hole existing in a current frame of the generated output view image using background information of one or more temporally neighboring frames.

The one or more temporally neighboring frames may be temporally adjacent to the reference view image.

The one or more temporally neighboring frames may be temporally adjacent to the output view image.

The foregoing and/or other aspects are achieved by providing a method of generating multi-views. The method includes generating, by way of a processor, an output view image based on at least one reference view image, detecting a crack in a predetermined object of the generated output view image, the predetermined object having different binocular disparity values allocated to different portions of the predetermined object, wherein the crack occurs in the predetermined object due to the generating of the output view image based on the at least one reference view image, and reassigning the crack as a hole and restoring the hole existing in a current frame of the generated output view image using background information of one or more temporally neighboring frames.

The foregoing and/or other aspects are achieved by providing a display device including an image processing apparatus. The display device includes an image generating unit to generate an output view image based on a reference view image and binocular disparity information of the reference view image, a neighboring image-based hole restoration unit to restore a hole using one or more temporally neighboring images, the hole being generated by the generating of the output view image, and a controller to generate a signal to be displayed by the display device based on the generated output view image having the hole restored by the neighboring image-based hole restoration unit.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These and/or other aspects and advantages will become apparent and more readily appreciated from the following description of the example embodiments, taken in conjunction with the accompanying drawings of which.

DETAILED DESCRIPTION

Figure 1:
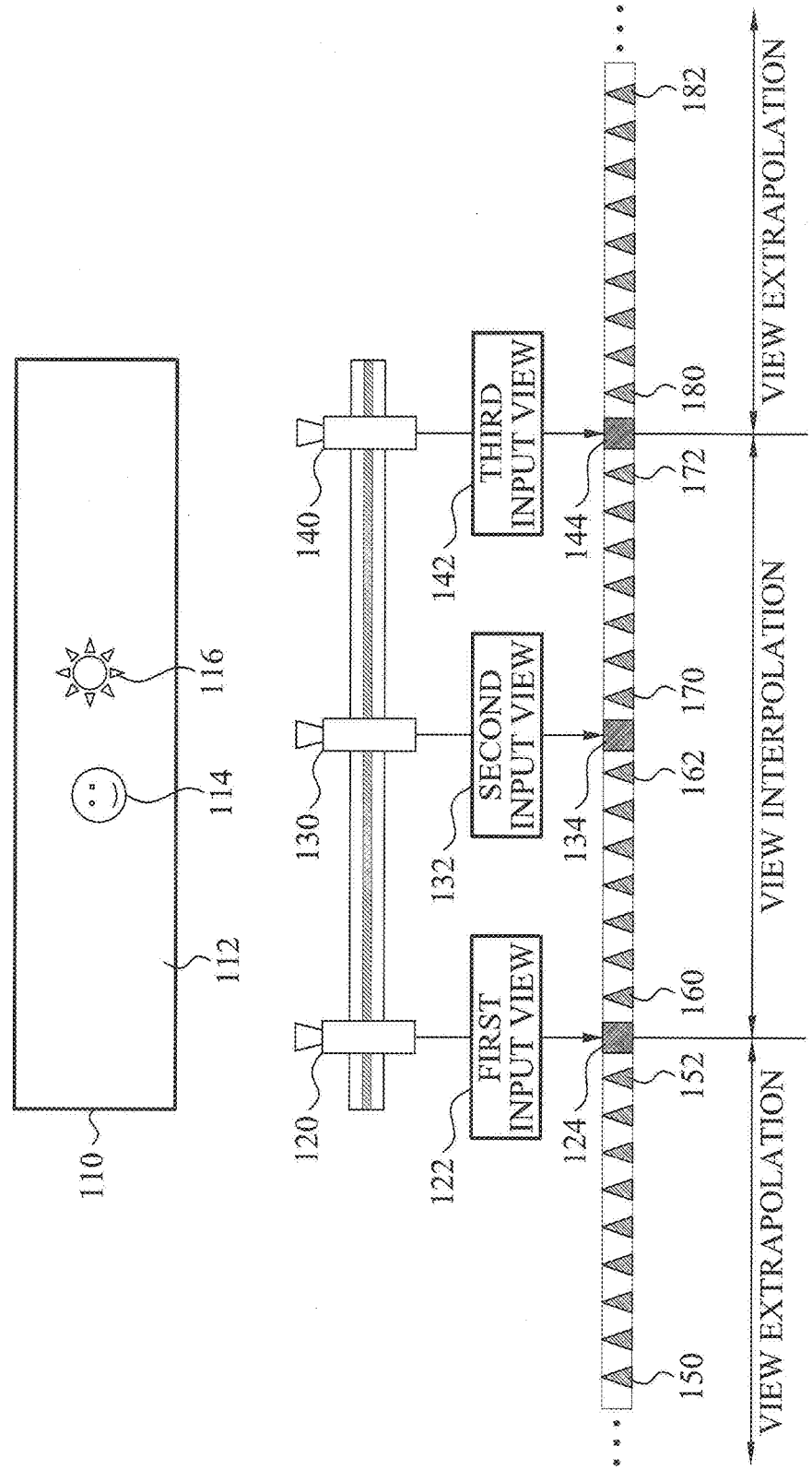
FIG. 1 illustrates a diagram of a view generation method based on three input views according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates a diagram of a view generation method based on three input views according to example embodiments.

In FIG. 1, an scene 110 to be captured may include a foreground, and a background 112. The foreground may include a first object 114 and a second object 116.

The first object 114 and the second object 116 may be moved relatively to a left side or right side with respect to the background 112, based on a viewpoint of a viewer.

A first input apparatus 120, for example a camera, may capture the scene 110 from a first viewpoint, and a second input apparatus 130 and a third input apparatus 140 may capture the scene 110 respectively from a second viewpoint and a third viewpoint.

The first input apparatus 120, the second input apparatus 130, and a third input apparatus 140 may capture the scene 110 from their respective viewpoints, and may respectively generate a first input view 122, a second input view 132, and a third input view 142.

For example, the first input view 122 may provide an image appearing when a viewer sees the scene 110 from the first viewpoint, and the second input view 132 and the third input view 142 may provide an image appearing when a viewer sees the scene 110 respectively from the second viewpoint and the third viewpoint.

Each of the first input view 122 to the third input view 142 may include a sequence of frames. Specifically, each of the first input view 122 to the third input view 142 may include a predetermined number of frames per unit time, for example frames output at 30 frames per second (FPS). A frame viewed from a predetermined viewpoint refers to data used to generate an image viewed from the predetermined viewpoint. Accordingly, each of the first input view 122 to the third input view 142 may provide a sequence of images, each corresponding to a particular moment in time.

A frame (or an image) may include pixels. The pixels in the frame (or the image) may have coordinate values including x coordinates and y coordinates.

Each pixel may have a color value. The color value may be expressed using a predetermined type, for example RGB or YCbCr, to represent colors.

Additionally, each pixel may have a depth value. The depth value may indicate a distance between an object (or a background) represented by pixels and a capturing time (namely, a viewpoint corresponding to a view). The depth value may be expressed using a predetermined binary type for representing the distance, for example, using an integer or a floating point.

Depth values of pixels may be included in a frame. In other words, the frame may have color values and depth values of the pixels.

Additionally, depth values of pixels may be provided separately from a frame. Depth information of a frame or image may indicate depth values of pixels forming the frame or image. The depth information of the frame may be provided separately from the frame or an input view. Depth information regarding an image in an input view may be provided separately from the input view.

In FIG. 1, quadrangles indicate a frame 124 of the first input view 122, a frame 134 of the second input view 132, and a frame 144 of the third input view 142, at a predetermined time "t."

A three-dimensional (3D) image apparatus needs to provide a user with an image viewed from viewpoints other than viewpoints corresponding to the first input view 122 to the third input view 142. Accordingly, the 3D image apparatus may generate an output view (or a target view) from the other viewpoints, based on the first input view 122 to the third input view 142. The viewpoints corresponding to the first input view 122 to the third input view 142 may also be referred to as "reference viewpoints" herein.

To provide an image appearing when a viewer sees the scene 110 from a viewpoint different from the reference viewpoints, an output view corresponding to an intermediate viewpoint needs to be generated through view extrapolation or view interpolation using frames provided by the first input view 122 to the third input view 142, which are respectively generated by the first input apparatus 120 to the third input apparatus 140.

Generation of the output view may refer to generation of frames of the output view, and may also refer to providing of images viewed from a viewpoint corresponding to the output view.

The output view may include, for example, an interpolated view generated by interpolation, or an extrapolated view generated by extrapolation.

View interpolation refers to generating an output view in a predetermined virtual viewpoint between viewpoints corresponding to the first input view 122 to the third input view 142. View interpolation may enable generation of an output view frame (or image) based on left and right input view frames (or images) that are adjacent to a virtual viewpoint to be generated. The output view generated by the view interpolation may be referred to as an "interpolated view".

View extrapolation refers to generating an output view in a viewpoint outside the viewpoints corresponding to the first input view 122 to the third input view 142. the view extrapolation enables generation of an output view in a viewpoint further to the left than a leftmost input view, namely the first input view 122, or an output view in a viewpoint further to the right than a rightmost input view, namely the third input view 142. The output view generated by the view extrapolation may be referred to as an "extrapolated view".

View extrapolation may enable an output view frame (or image) to be generated based on a frame (or image) of a single outermost input view (for example, the first input view 122 or the third input view 142). Accordingly, information available for the view extrapolation may be relatively limited compared to information available for the view interpolation. Since a relatively small amount of information may be used to perform the view extrapolation, a quality of an image generated by the view extrapolation may be considerably degraded, compared to an image generated by the view interpolation.

Referring to FIG. 1, triangles 150, 152, 160, 162, 170, 172, 180, and 182 indicate an interpolated view frames or extrapolated view frames.

An extrapolated view may correspond to a viewpoint further to the left than the leftmost reference view 122, and a viewpoint further to the right than the rightmost input view 142. For example, frames 150, 152, 180, and 182 are extrapolated view frames at a time t.

An interpolated view may correspond to a virtual viewpoint generated between viewpoints corresponding to input views 122, 132, and 142. For example, frames 160, 162, 170, and 172 of the interpolated view in the time t are illustrated.

The interpolated view and the extrapolated view may each include a sequence of frames occurring over a predetermined period of time.

Frames of an interpolated view, or frames of an extrapolated view may not include depth information. In other words, the frames of the interpolated view, or the frames of the extrapolated view may be two-dimensional (2D) frames.

As described above, M output views in different viewpoints may be generated from viewpoints corresponding to N input views.

When the 3D image apparatus provides a viewer with predetermined output views among the M output views based on a location of the viewer, the viewer may perceive consecutive real 3D images through the predetermined output views. For example, when the 3D image apparatus respectively outputs a first output view and a second output view to a left eye and right eye of the viewer, the viewer may perceive a 3D image.

Figure 2:
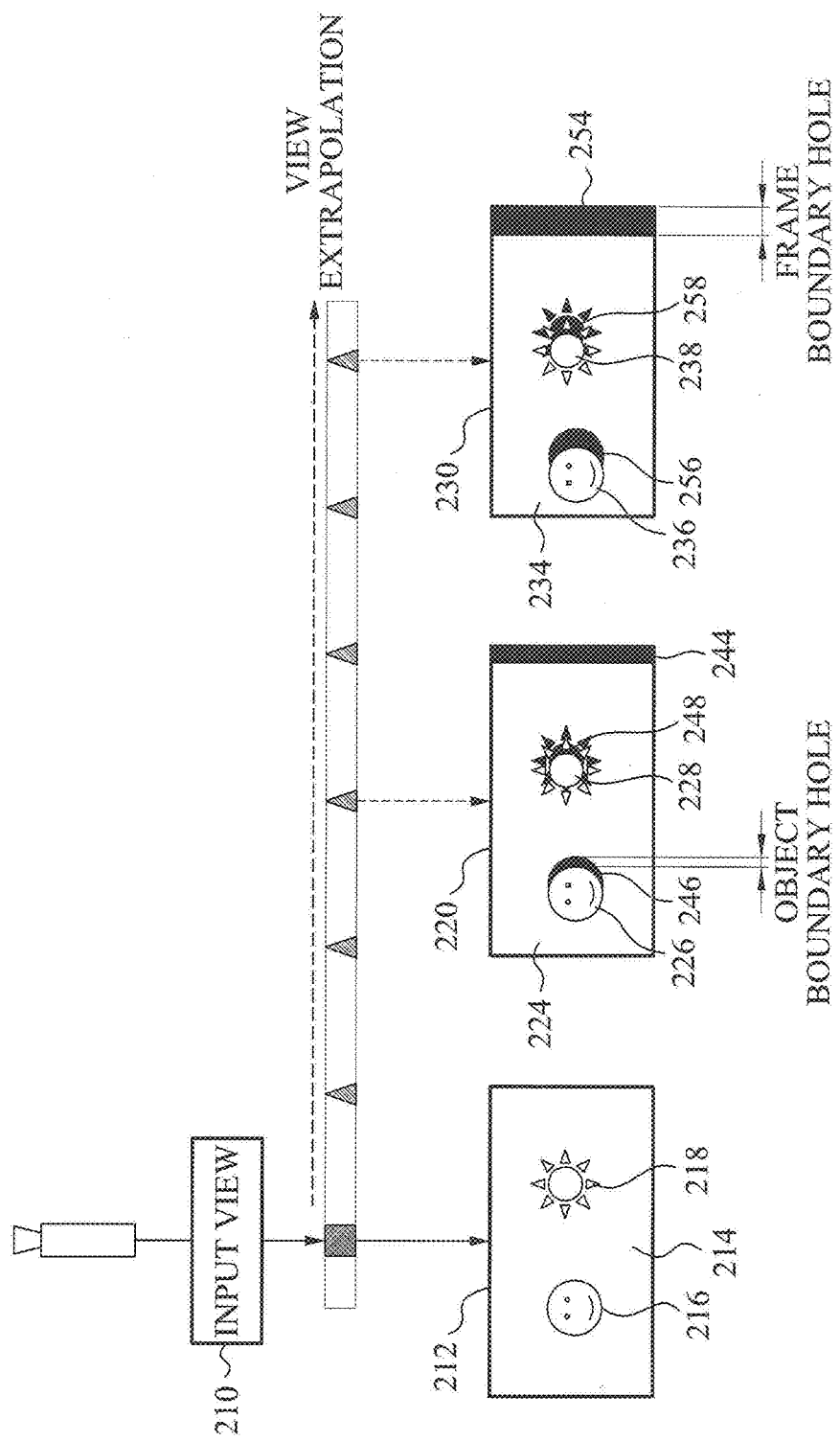
FIG. 2 illustrates a diagram of a scheme of generating frames of an extrapolated view according to example embodiments.

FIG. 2 illustrates a diagram of a scheme of generating frames of an extrapolated view according to example embodiments.

In FIG. 2, a sequence of frames may be provided through an input view 210, for example, a frame 212 of the input view 210 at a predetermined time t.

A first extrapolated view and a second extrapolated view may be generated based on the input view 210, through view extrapolation yielding a viewpoint further to the right than the input view 210.

A frame 220 of the first extrapolated view, and a frame 230 of the second extrapolated view in the predetermined time t may be generated using the frame 212 of the input view 210.

The input view 210 may be obtained by capturing the scene 110 of FIG. 1, and the frame 212 of the input view 210 may include, for example, a background 214, a first object 216, and a second object 218.

Also, the frame 220 of the first extrapolated view may include a background 224, a first object 226, and a second object 228. In addition, the frame 230 of the second extrapolated view may include a background 234, a first object 236, and a second object 238.

A viewpoint corresponding to the first extrapolated view may be located further to the right than a viewpoint corresponding to the input view 210. Accordingly, the background 224, the first object 226, and the second object 228 in the frame 220 of the first extrapolated view may be located further to the left than the frame 212 of the input view 210.

A location of the background 224 further to the left may be determined based on a distance from the viewpoint corresponding to the input view 210 to the background 224, and based on a distance between the viewpoint corresponding to the input view 210 and the viewpoint corresponding to the first extrapolated view.

As described above, since the background 224 moves to the left, the frame 220 of the first extrapolated view may have a frame boundary hole 244 that may not be adequately filled by the frame 212 of the input view 210. The background 224 may not be moved, depending on circumstances. When the background 224 is not moved, the frame boundary hole 244 may not be generated.

The first object 226 and the second object 228 of the foreground may be moved together with the background 224. Additionally, the first object 226 and the second object 228 may be moved further to the left than the background 224.

Locations of the first object 226 and the second object 228 further to the left than the background 224 may be respectively determined based on a distance from the viewpoint corresponding to the input view 210 to the first object 226, and a distance from the viewpoint corresponding to the input view 210 to the second object 228, and based on the distance between the viewpoint corresponding to the input view 210 and the viewpoint corresponding to the first extrapolated view.

Since the first object 226 and the second object 228 are moved further to the left than the background 224, the frame 220 of the first extrapolated view may have object boundary holes 246 and 248 that may not be adequately filled by the frame 212 of the input view 210.

To generate an extrapolated view, suitable pixels need to be extrapolated into the frame boundary hole 244 and the object boundary holes 246 and 248.

The frame 230 of the second extrapolated view may also have a frame boundary hole 254, and object boundary holes 256 and 258.

A viewpoint corresponding to the second extrapolated view is further away from the viewpoint corresponding to the input view 210, compared to a viewpoint corresponding to the first extrapolated view. A background 234, a first object 236, and a second object 238 in the frame 230 of the second extrapolated view may be respectively placed further to the left than the background 224, the first object 226, and the second object 228 in the frame 220 of the first extrapolated view.

The frame boundary hole 254 and the object boundary holes 256 and 258 in the frame 230 may be respectively formed to be horizontally wider than the frame boundary hole 244 and the object boundary holes 246 and 248 in the frame 220.

Accordingly, a larger number of pixels need to be extrapolated into the frame boundary hole 254 and the object boundary holes 256 and 258 in frame 230.

In other words, as a viewpoint corresponding to the extrapolated view is further away from an outermost input view, a range of pixels to be extrapolated may be wider.

Hereinafter, all of the frame boundary holes 244 and 254 and the object boundary holes 246, 248, 256, and 258 may be referred to as "holes".

Figure 3:
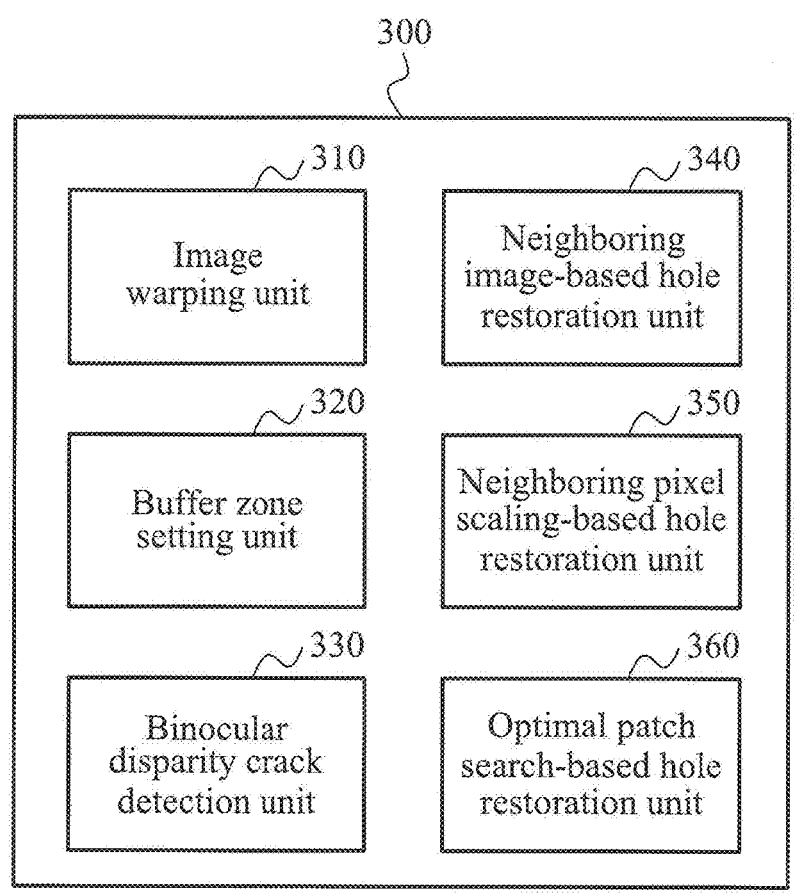
FIG. 3 illustrates a block diagram of a configuration of an image processing apparatus according to example embodiments.

FIG. 3 illustrates a block diagram of a configuration of an image processing apparatus according to example embodiments.

The image processing apparatus illustrated in FIG. 3 may generate an output view through view interpolation and view extrapolation that each use a reference view image and binocular disparity information of the reference view image. Additionally, the image processing apparatus may restore holes that are generated by the view interpolation and the view extrapolation in an output view image.

The output view image may refer to an image viewed from a viewpoint corresponding to an output view. As described above, when an image viewed from a new viewpoint is generated, a point needing to be newly observed from the new viewpoint may be displayed as a hole in the image.

The image processing apparatus may restore holes that are generated during the view interpolation and view extrapolation.

Referring to FIG. 3, the image processing apparatus 300 may include, for example, an image warping unit 310, a buffer zone setting unit 320, a binocular disparity crack detection unit 330, a neighboring image-based hole restoration unit 340, a neighboring pixel scaling-based hole restoration unit 350, and an optimal patch search-based hole restoration unit 360.

The image warping unit 310 may generate an output view image by way of image warping using a reference view image and binocular disparity information of the reference view image. Specifically, the image warping unit 310 may generate frames of an output view using a reference view frame and binocular disparity information of the reference view frame.

The image warping unit 310 may generate an output view image by image warping a reference view image. For example, when binocular disparity information of the reference view image is not provided, the image warping unit 310 may generate the binocular disparity information of the reference view image.

N input images, namely N images corresponding to reference views, may be arranged based on an epipolar line.

A view corresponding to a virtual viewpoint (namely, an output view) may be generated using a weight that is in proportion to a distance from a reference view to the view corresponding to the virtual viewpoint. In other words, the view corresponding to the virtual viewpoint may be generated using a weight that is in proportion to a distance between the virtual viewpoint and a viewpoint corresponding to the reference view.

A y coordinate value of a first pixel in the output view image may be equal to a y coordinate value of a second pixel in the reference view image. Here, the first pixel and the second pixel may correspond to each other. In other words, a y coordinate value of a pixel may remain unchanged even though image warping is performed.

An x coordinate value of the first pixel may be calculated by the following Equation 1:

$$I_{rendered\ view}(x') = I_{reference\ view}(x + \alpha \cdot d) \quad \text{[Equation 1]}$$

In Equation 1, $I_{reference\ view}$ denotes an image or a frame (or an image) of a reference view (or an input view), and $I_{rendered\ view}$ denotes an image (or a frame) of an output view (or a rendered view).

Additionally, x denotes an x coordinate value of the second pixel in the reference view, and x' denotes the x coordinate value of the first pixel in the output view.

Furthermore, d denotes a binocular disparity value of the second pixel that is derived from depth information of an image or depth information of a pixel. Generally, a binocular disparity value of a pixel may be in inverse proportion to a depth value of a pixel. Accordingly, the above-description of the depth and depth information may also be applied to binocular disparity and binocular disparity information.

In addition, $\alpha$ denotes a weight in proportion to a distance between a viewpoint corresponding to a reference view and a viewpoint corresponding to an output view.

Accordingly, Equation 1 may indicate the following five pieces of information:

1) The second pixel in the reference view may be moved by "$\alpha d$" by a warping operation. In other words, when the second pixel in the reference view corresponds to the first pixel in the output view, the x coordinate value of the first pixel may be obtained by adding "$\alpha d$" to the x coordinate value of the second pixel.

2) A pixel having a high binocular disparity value may be moved a long distance by the warping operation. Since a binocular disparity value is in inversely proportion to a depth value, a pixel having a low depth value may be moved a longer distance than a pixel having a high depth value.

Furthermore, an object may be close to the viewpoint corresponding to the reference view, and a background may be far from the viewpoint corresponding to the reference view. Accordingly, a pixel representing the object among pixels in the reference view image may be moved a longer distance than a pixel representing the background.

A pixel having an infinite depth value, or a pixel having a binocular disparity value of "0" may not be moved even though the warping operation is performed.

3) As the viewpoint corresponding to the reference view and the viewpoint corresponding to the output view are further away from each other, pixels in the reference view may be moved a longer distance.

The image warping unit 310 may generate an output view image by an image warping using various warping schemes, other than the warping operation based on Equation 1 described above.

4) A binocular disparity value (or a depth value) of the first pixel may be equal to a binocular disparity value (or a depth value) of the second pixel.

5) At least one pixel in the reference view image may be moved to a same coordinate in the output view. Here, a closest pixel to the viewpoint corresponding to the output view among the at least one pixel may be displayed first of all.

The buffer zone setting unit 320 may expand a hole generated by the image warping.

A hole expansion by the buffer zone setting unit 320 will be described in detail with reference to FIG. 5 below.

The binocular disparity crack detection unit 330 may set, as a hole, a crack in the generated output view image.

A hole setting by the binocular disparity crack detection unit 330 will be described in detail with reference to FIG. 6 below.

The neighboring image-based hole restoration unit 340 may restore a hole generated by image warping. The restoring of the hole by the neighboring image-based hole restoration unit 340 will be further described with reference to FIG. 4.

Subsequently, the neighboring pixel scaling-based hole restoration unit 350 may restore a hole generated by the image warping, by scaling at least one pixel adjacent to the hole.

Scaling of neighboring background pixels by the neighboring pixel scaling-based hole restoration unit 350 will be further described with reference to FIGS. 7 through 9 below.

The optimal patch search-based hole restoration unit 360 may restore the hole by searching for, from a background, a patch that is most similar to a region including the hole, and by using the found patch.

An optimal patch search and a hole restoration by the optimal patch search-based hole restoration unit 360 will be further described with reference to FIG. 10 below.

After a portion of the hole has been restored by the neighboring image-based hole restoration unit 340, any remaining portion or portions of the hole may be restored by the neighboring pixel scaling-based hole restoration unit 350 and the optimal patch search-based hole restoration unit 360.

The neighboring pixel scaling-based hole restoration unit 350, and the optimal patch search-based hole restoration unit 360 may restore the other portion using background pixels of the output view image.

A scheme of restoring a hole may be determined based on characteristics of regions adjacent to the hole.

In an example in which a texture region is adjacent to the hole, the optimal patch search-based hole restoration unit 360 may restore the hole. In another example in which regions other than the texture region are adjacent to the hole, the neighboring pixel scaling-based hole restoration unit 350 may restore the hole. The neighboring pixel scaling-based hole restoration unit 350 may perform scaling on background pixels, which may result in damaging a texture.

Specifically, when uniform regions are adjacent to the hole, or when a strong edge appears on a region adjacent to the hole, the hole may be restored by scaling background pixels. Accordingly, characteristics of neighboring regions (namely, a background) may be maintained even in the restored hole.

Additionally, when a texture region is adjacent to the hole, a region most similar to the texture region may be detected from a background region in the reference view image. The detected region may be used to restore the hole. Accordingly, texture components may be maintained even in the restored hole.

Figure 4:
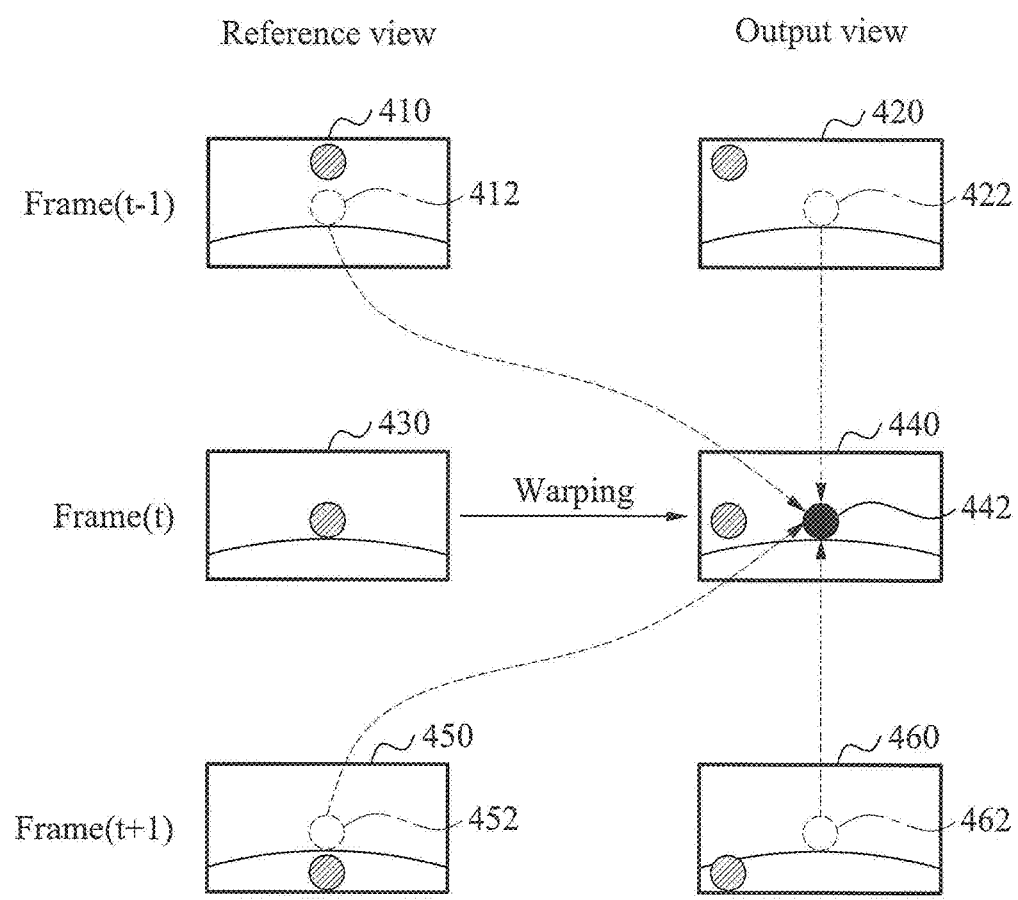
FIG. 4 illustrates a diagram of a restoration of a hole using temporally neighboring images according to example embodiments.

FIG. 4 illustrates a diagram of a restoration of a hole using temporally neighboring images according to example embodiments.

Among a series of temporal images, a reference view image at time t may be used in image warping to generate an output view image at time t. Hereinafter, the reference view image or the output view image at time t may be referred to as an "image t" or as a current image. Likewise, a frame at time t may be referred to as a "frame t" or as a current frame. Additionally, a frame at time t−1 may be referred to as a "frame t−1" or as a previous frame, and a frame at time t+1 may be referred to as a "frame t+1" or as a next frame.

In FIG. 4, an output view frame t 440 may include a hole 442. The output view frame t 440 may be generated by warping a reference view frame t 430.

Generally, images temporally adjacent to the image t may represent a foreground (or object) and a background that are the same as or similar to a foreground (or object) and background represented by the image t. For example, an image t−1, an image t+1, an image t−2, an image t+2, and the like may be temporally adjacent to the image t. Accordingly, the hole generated by the image warping may be restored using information of the temporally neighboring images that are temporally adjacent to a reference view image, or an output view image.

In FIG. 4, an object corresponding to a foreground may be vertically moved. Accordingly, a portion 412 corresponding to a background covered by the object in the reference view frame t 430 may be exposed in a reference view frame t−1 410. Additionally, a portion 452 of a reference view frame t+1 450, a portion 422 of an output view frame t−1 420, and a portion 462 of an output view frame t+1 460 may also correspond to the background covered by the object in the reference view frame t 430. Accordingly, the portions 412, 422, 452, and 462 may be used to restore the hole 442.

The neighboring image-based hole restoration unit 340 may restore the hole 442 in an output view image t, based on Equation 2 below. Equation 2 may be used to explain a method of restoring a hole in a frame using frames temporally adjacent to an output view frame.

$$f_t(i, j) = \frac{\alpha_{t-1} \cdot f_{t-1}(i, j) + \alpha_{t+1} \cdot f_{t+1}(i, j)}{\alpha_{t-1} + \alpha_{t+1}} \quad \text{[Equation 2]}$$

In Equation 2, $f_t$ denotes the output view frame t 440, that is, a frame generated by warping at time t.

$f_t(i, j)$ denotes a color value of a pixel having a coordinate value "(i, j)" among pixels of the output view frame t 440. The pixel having the coordinate value "(i, j)" may be a pixel in the hole 442, in the output view frame t 440. Hereinafter, the pixel having the coordinate value "(i, j)" may be represented as a "pixel (i, j)".

$f_{t-1}$ denotes a frame previous to the output view frame t 440, namely, the output view frame t−1 420. $f_{t+1}$ denotes a frame next to the output view frame t 440, namely, the output view frame t+1 460.

In other words, the neighboring image-based hole restoration unit 340 may restore a hole generated by image warping, using output view frames temporally adjacent to the output view frame t 440.

$\alpha_{t-1}$ denotes a coefficient used to determine whether a pixel (i, j) of the output view frame t−1 420 is to be used to restore a pixel (i, j) of the output view frame t 440. $\alpha_{t-1}$ may have a value of "0" or "1". When $\alpha_{t-1}$ has a value of "0", the pixel (i, j) of the output view frame t−1 420 may not be used to restore the pixel (i, j) of the output view frame t 440.

$\alpha_{t+1}$ denotes a coefficient used to determine whether a pixel (i, j) of the output view frame t+1 460 is to be used to restore the pixel (i, j) of the output view frame t 440. $\alpha_{t+1}$ may have a value of "0" or "1". When $\alpha_{t-1}$ has a value of "0", the pixel (i, j) of the output view frame t+1 460 may not be used to restore the pixel (i, j) of the output view frame t 440.

In an example, when both $\alpha_{t-1}$ and $\alpha_{t+1}$ have a value of "1", an average value of a color value of the pixel (i, j) of the output view frame t−1 420 and a color value of the pixel (i, j) of the output view frame t+1 460 may be used as a color value of the pixel (i, j) of the output view frame t 440. In another example, when $\alpha_{t-1}$ has a value of "0", and when $\alpha_{t+1}$ has a value of "1", the color value of the pixel (i, j) of the output view frame t 440 may be equal to the color value of the pixel (i, j) of the output view frame t+1 460. In still another example, when $\alpha_{t-1}$ has a value of "1", and when $\alpha_{t-1}$ has a value of "0", the color value of the pixel (i, j) of the output view frame t 440 may be equal to the color value of the pixel (i, j) of the output view frame t−1 420.

Pixels used to restore a hole may be regarded as pixels included in a background. In general, a position of a background may not be changed by warping. For example, a position of the portion 412 in the reference view frame t−1 410 and a color of the portion 412 may be identical to a position of the portion 422 in the output view frame t−1 420 and a color of the portion 422, respectively. In other words, in the background, a coordinate of a first pixel in a reference view frame may be identical to a coordinate of a corresponding second pixel included in an output view frame.

Accordingly, the neighboring image-based hole restoration unit 340 may restore a hole generated by image warping, using temporally adjacent reference view frames. In other words, $f_{t-1}$ and $f_{t+1}$ in Equation 2 may be respectively replaced by $f'_{t-1}$ denoting the reference view frame t−1 410, and $f'_{t+1}$ denoting the reference view frame t+1 450.

Similarly, $f_{t-1}$ and $f_{t+1}$ in Equation 2 may be respectively replaced by $f_{t-2}$ and $f_{t+2}$ or any other temporally neighboring output view frames. $f_{t-1}$ and $f_{t+1}$ in Equation 2 may also be respectively replaced by $f'_{t-2}$ and $f'_{t+2}$ or any other temporally neighboring reference view frames. To summarize, the neighboring image-based hole restoration unit 340 may restore a hole in an output view image generated by image warping, using one or more temporally neighboring reference images or one or more temporally neighboring output images.

Based on Equation 2, the neighboring image-based hole restoration unit 340 restores the hole 442 using one or two output view frames, namely, using the output view frame t−1 420 and the output view frame t+1 460. However, more than two temporally neighboring output view frames (or reference view frames) may be used to restore the hole 442. For example, output view frames (or reference view frames) at times t−2, t−1, t+1 and t+2 or any other three or more temporally neighboring images may be used to restore the hole 442.

Temporally neighboring images need not be symmetrical with respect to an image at time t. For example, a hole in an image at time t may be restored using images at times t−2 and t−1, or images at times t−3, t−2, and t−1, or any other temporally non-symmetrical images.

Also, the number of temporally neighboring images may be dynamically changed based on a storage capacity of the image processing apparatus 300, a complexity of the reference view image, a complexity of the output view image, and the like.

In Equation 2, pixels having the same coordinate value as a pixel of the frame t may be used to restore a color value of the pixel of the frame t. In other words, the color values may be restored on the assumption that a series of images have not been moved. In fact, in certain situations, a background of an image may hardly, or not at all, be moved.

When the series of images are moved temporally, the color value of the pixel of the output view frame t 440 may be restored based on a movement of the series of images.

For example, when the output view frame t 440 is moved by a single pixel further to the left than the output view frame t−1 420 (or the reference view frame t−1 410), a color value of a pixel (i+1, j) of the output view frame t−1 420 (or the reference view frame t−1 410) may be used to set the color value of the pixel (i, j) of the output view frame t 440.

In other words, the neighboring image-based hole restoration unit 340 may restore a first pixel in a hole of the output view image t, by using color values of pixels that are included in output view images adjacent to the output view image t and that correspond to the first pixel, or by using color values of pixels that are included in reference view images adjacent to the reference view image t and that correspond to the first pixel.

Additionally, when all of the reference view image t and reference view images temporally adjacent to the reference view image t are moved over time, the neighboring image-based hole restoration unit 340 may select pixels corresponding to the first pixel from the reference view images (or output view images) temporally adjacent to the reference view image t (or the output view image t), based on a movement of the reference view image and the reference view images.

The neighboring image-based hole restoration unit 340 may determine a coefficient α based on the following Equation 3:

$$\alpha_t = \begin{cases} 1, & \text{if } f_t(i,\ j) \neq \text{hole pixel, and } D(f_t(i,\ j)) < Th \\ 0, & \text{otherwise} \end{cases} \quad \text{[Equation 3]}$$

In Equation 3, $D(f_t(i, j))$ denotes a binocular disparity value of the pixel (i, j) of the output view frame t 440. Th denotes a threshold defined in advance. Accordingly, when $f_t(i, j)$ does not indicate a hole pixel and when a binocular disparity value of $f_t(i, j)$ is defined in advance, $\alpha_t$ may have a value of "1", and otherwise, $\alpha_t$ may have a value of "0".

First, whether $f_t(i, j)$ indicates a hole pixel representing a hole may be determined.

When $f_t(i, j)$ is determined to indicate a hole pixel, a color value of $f_t(i, j)$ does not exist, or $f_t(i, j)$ may have an invalid color value. Accordingly, the color value of $f_t(i, j)$ may not be used to restore the hole in the output view image. Thus, $\alpha_t$ may have a value of "0".

In other words, the neighboring image-based hole restoration unit 340 may restore the hole in the output view image t, by excluding corresponding hole pixels in temporally neighboring reference view images. Additionally, the neighboring image-based hole restoration unit 340 may restore the hole in the output view image t, by excluding corresponding hole pixels that are included in temporally neighboring output view images.

When $f_t(i, j)$ is not a hole pixel, whether $f_t(i, j)$ indicates a foreground pixel or a background pixel may be determined. Here, the foreground pixel may represent a foreground, and the background pixel may represent a background.

A hole generated by multi-view rendering may include a portion of a background that is viewed in an output view image generated through the warping operation even though the portion of the background is covered by a foreground in a reference view image.

Accordingly, $f_t(i, j)$ may be used to restore the hole in the output view image, only when $f_t(i, j)$ is determined to indicate a background pixel.

In other words, the neighboring image-based hole restoration unit 340 may restore the hole in the output view image t, using only corresponding background pixels in temporally neighboring reference view images. Additionally, the neighboring image-based hole restoration unit 340 may restore the hole in the output view image t, using only corresponding background pixels in temporally neighboring output view images.

The binocular disparity value of $f_t(i, j)$ may be used to determine whether $f_t(i, j)$ indicates the foreground pixel or the background pixel.

Generally, a foreground pixel may have a higher binocular disparity value than a background pixel.

When the binocular disparity value of $f_t(i, j)$ is less than the threshold Th, the neighboring image-based hole restoration unit 340 may regard $f_t(i, j)$ as a background pixel, and may use $f_t(i, j)$ to restore the hole.

Figure 5:
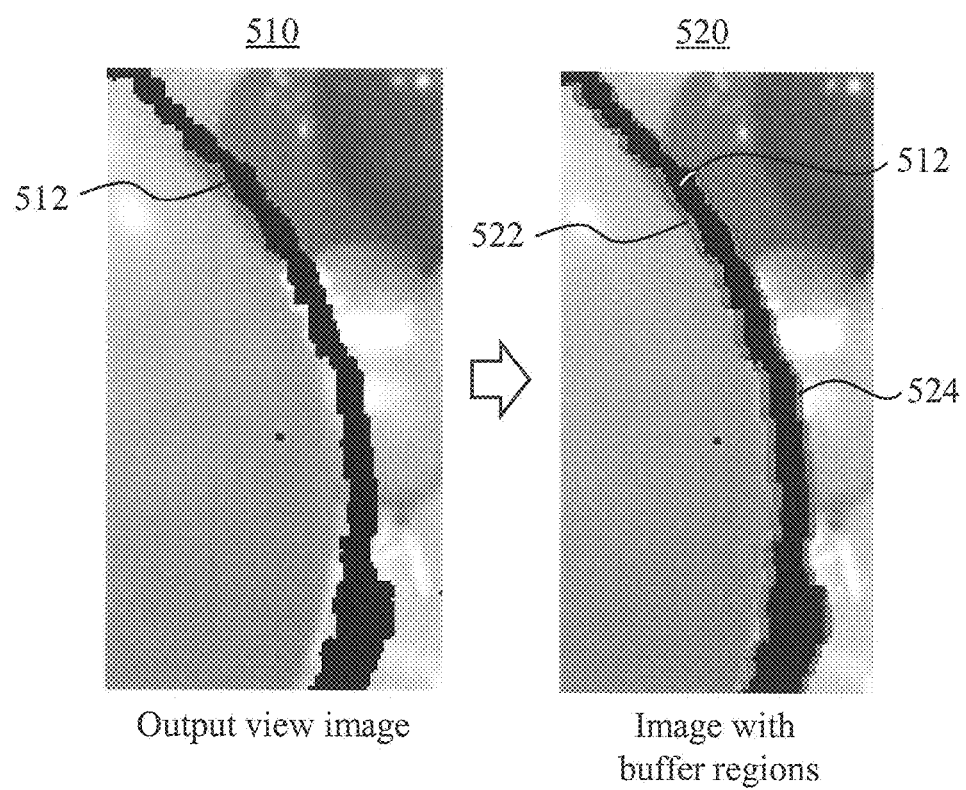
FIG. 5 illustrates a diagram of a hole expansion by setting a buffer zone according to example embodiments.

FIG. 5 illustrates a diagram of a hole expansion by setting a buffer zone according to example embodiments.

Specifically, FIG. 5 illustrates an output view image 510, and an output view image 520 having buffer regions 522 and 524.

A binocular disparity value of a pixel used in multi-view rendering may be acquired by converting a physical depth value of the pixel. Additionally, the binocular disparity value of the pixel may be determined by an estimation scheme using a reference image.

The pixel may have an incorrect binocular disparity value due to a matching error and the like, in particular, when the binocular disparity value is acquired by estimation.

When the pixel has the incorrect binocular disparity value, a boundary between a foreground and a background of the output view image 510 may be inconsistent with a boundary between a foreground and a background of the binocular disparity image.

Pixels on a left side of a hole region 512 of the output view image 510 may have color values representing a background due to the inconsistency, despite the pixels representing a foreground.

Thus, when an estimated binocular disparity value is used, regions adjacent to the hole may need to be set as buffer regions to prevent this problem.

Accordingly, the buffer zone setting unit 320 may expand the hole by regarding the buffer regions 522 and 524 adjacent to the hole as the hole.

The buffer zone setting unit 320 may set, as buffer regions, pixels having a distance from the hole (or an outermost point of the hole) that is less than a threshold defined in advance.

When color values of pixels in the buffer regions are restored, the following Equation 4 may be used:

$$f_t(i, j) = \frac{\alpha_{t-1} \cdot f_{t-1}(i, j) + f_t(i, j) + \alpha_{t+1} \cdot f_{t+1}(i, j)}{\alpha_{t-1} + 1 + \alpha_{t+1}} \quad \text{[Equation 4]}$$

In Equation 4, to restore a color value of a pixel (i, j) of a frame t, the color value of the pixel (i, j) of the frame t may be used together with a color value of a pixel of a frame previous to the frame t, and a color value of a pixel of a frame next to the frame t. A pixel (i, j) of the buffer region may have a color value in advance, differently from a pixel that is a hole. Accordingly, a color value of the pixel (i, j) of the buffer region may be used to restore the pixel (i, j) of the buffer region regarded as a hole.

In other words, the neighboring image-based hole restoration unit 340 may restore a first pixel in the buffer region, based on a color value of the first pixel.

Figure 6:
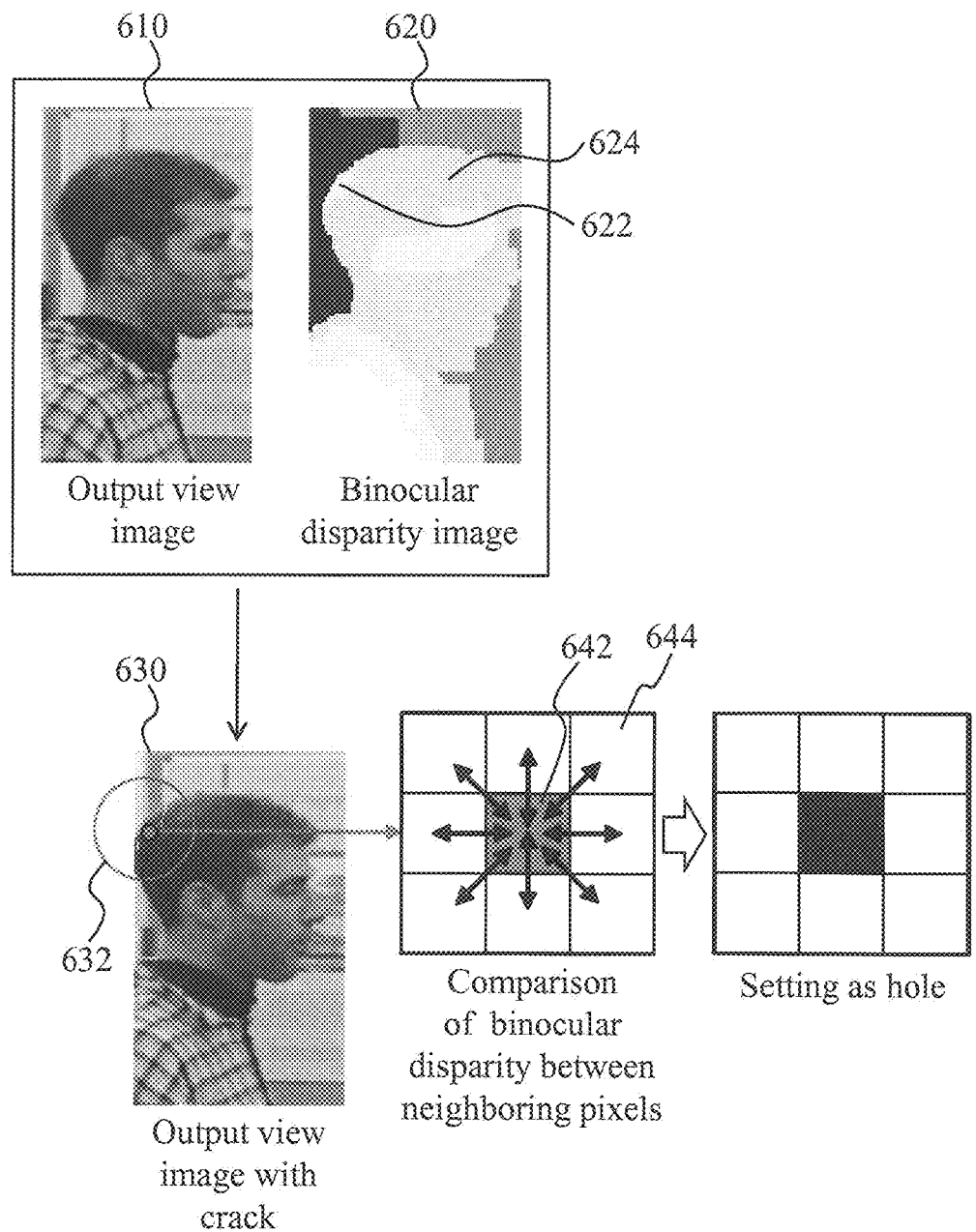
FIG. 6 illustrates a diagram of an occurrence of a crack and hole setting by detection of a binocular disparity crack according to example embodiments.

FIG. 6 illustrates a diagram of an occurrence of a crack and hole setting by detection of a binocular disparity crack according to example embodiments.

Specifically, FIG. 6 illustrates a reference view image 610, and a binocular disparity image 620 of the reference view image 610.

As illustrated in FIG. 6, a first portion 622 and a second portion 624 of the binocular disparity image 620 may have different binocular disparity values. Generally, since the first portion 622 and the second portion 624 represent the same object, the first portion 622 and the second portion 624 need to have the same or similar binocular disparity values. However, in particular when a binocular disparity value is estimated, the first portion 622 and the second portion 624 may have different binocular disparity values.

The first portion 622 and the second portion 624 may move different distances due to the different binocular disparity values of the first portion 622 and the second portion 624.

Since the first portion 622 and the second portion 624 move different distances, a crack 632 may occur between portions of an output view image 630 that respectively correspond to the first portion 622 and the second portion 624. Here, the output view image 630 may be generated by the warping operation.

A background may be displayed at a portion where the crack 632 occurs, instead of a foreground, In other words, a background may be displayed instead of the first portion 622 and the second portion 624.

Thus, the crack 632 may refer to a portion where a background is displayed between separated portions of an object due to different binocular disparity values. When different binocular disparity values are allocated to portions of an object, and when the predetermined object is warped, a crack may occur in the object. In the portion where the crack 632 occurs, a color value of the background may be warped. Accordingly, a quality of the output view image 630 may be degraded due to the crack 632.

When a crack is set as a hole, a hole restoration method may also be applied to a portion where the crack occurs. Thus, it is possible to prevent an image quality from being reduced due to a crack.

The binocular disparity crack detection unit 330 may detect a crack from an output view image, and may set, as a hole, a portion where the crack occurs.

The crack may be detected based on the following Equation 5:

$$|\Theta(D_{i,j} - D_{i+m, j+n})| > Th \quad \text{[Equation 5]}$$

In Equation 5, $D_{i,j}$ denotes a binocular disparity value of a pixel (i, j) 642 in the output view image 630.

The pixel (i, j) 642 denotes a target pixel of a crack detection.

$D_{i+m, j+n}$ denotes a binocular disparity value of a pixel (i+m, j+n) adjacent to the pixel (i, j) 642.

Th denotes a threshold defined in advance.

When a total sum of differences in a binocular disparity value between a pixel and neighboring pixels 644 in the output view image 630 is greater than a predetermined value, the binocular disparity crack detection unit may detect the pixel as a crack.

The crack may occur, because a background pixel is warped in a region where a foreground needs to be represented. Accordingly, a difference between a binocular disparity value of a background pixel at the crack and a binocular disparity value of a foreground pixel adjacent to the background pixel may be large.

Accordingly, the crack may be detected based on a difference in a binocular disparity value between neighboring pixels 644. Additionally, the detected crack may be set as a hole, thereby compensating for degradation in image quality.

The neighboring pixels 644 of FIG. 6 are merely examples. Any combination of pixels spaced from a first pixel in an output view may be used as pixels adjacent to the first pixel.

Figure 7:
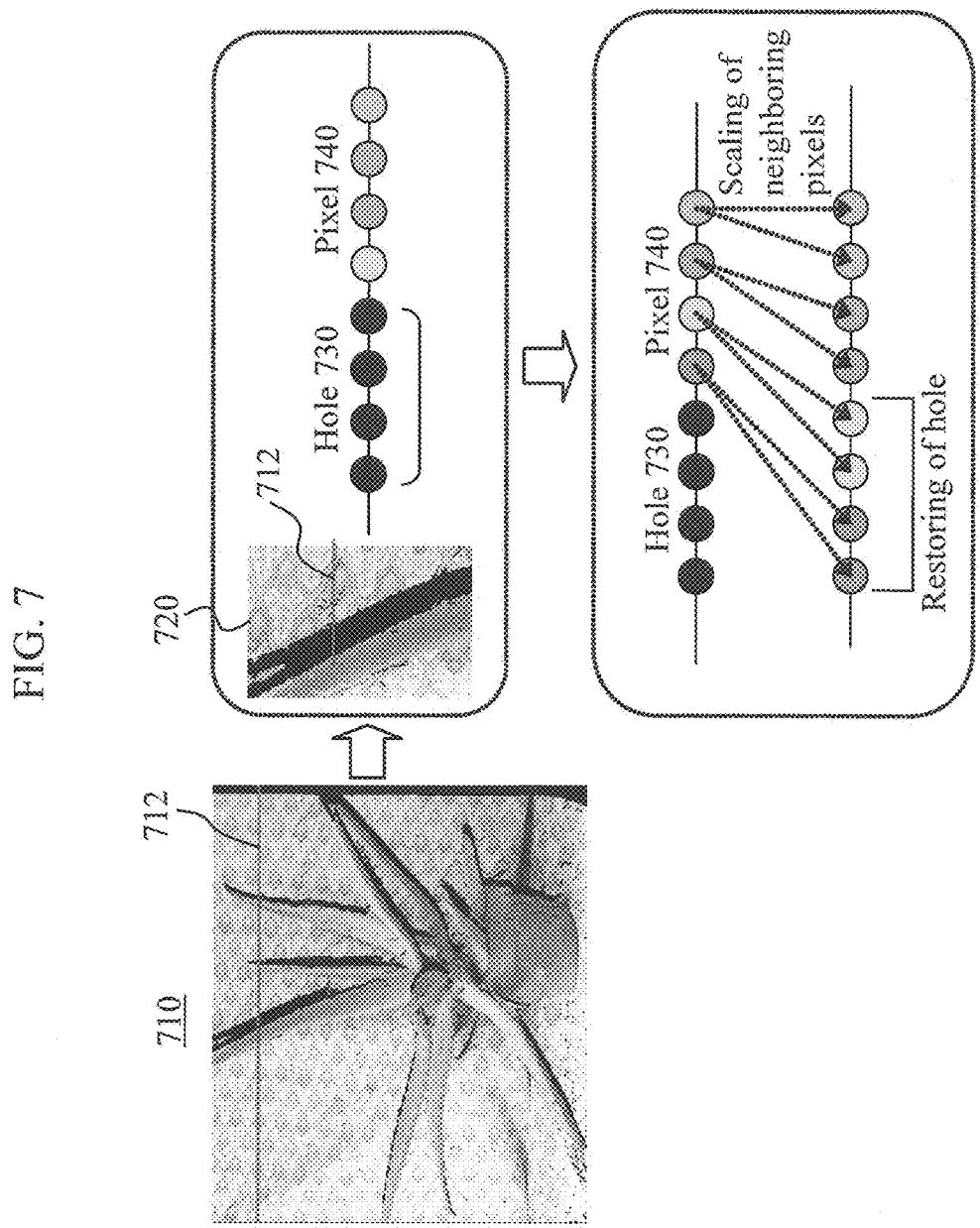
FIG. 7 illustrates a diagram of scaling of neighboring pixels according to example embodiments.

FIG. 7 illustrates a diagram illustrating scaling of neighboring pixels according to example embodiments.

The neighboring pixel scaling-based hole restoration unit 350 may restore a hole of an image 710 using at least one pixel adjacent to the hole.

The neighboring pixel scaling-based hole restoration unit 350 may horizontally perform scaling of pixels.

Referring to FIG. 7, a horizontal line 712 may be targeted for hole restoration.

The neighboring pixel scaling-based hole restoration unit 350 may detect the hole from the horizontal line 712, and may detect a number of consecutive hole pixels 730.

The neighboring pixel scaling-based hole restoration unit 350 may perform horizontal scanning to detect the hole.

The neighboring pixel scaling-based hole restoration unit 350 may select a same number of pixels 740 as the number of consecutive hole pixels 730. The selected pixels 740 are typically non-hole pixels.

The selected pixels 740 may be adjacent to the consecutive hole pixels 730.

The selected pixels 740 may be on the same line as the consecutive hole pixels 730.

The selected pixels 740 may be placed on the right side of the consecutive hole pixels 730. However, pixels on the left side of the consecutive hole pixels 730 may also be selected. Additionally, pixels on the right side and the left side of the consecutive hole pixels 730 may be selected.

The neighboring pixel scaling-based hole restoration unit 350 may restore a hole by scaling the selected pixels 740 towards the hole pixels 730.

For example, a color value of a first selected pixel may be used to generate a color value of a first hole pixel and a color value of a second hole pixel. Accordingly, the first hole pixel and the second hole pixel may be restored using the first selected pixel.

The scaling of the selected pixels 740 may enable doubling of a region represented by the selected pixels 740, and replacing regions represented by the hole pixels 730 and the selected pixels 740 with the doubled region.

Here, the number of hole pixels 730 may be equal to the number of the selected pixels 740. Accordingly, two pixels among the selected pixels 740 may be scaled at a time, so that all holes may be restored. Additionally, the selected pixels 740 may be uniformly scaled.

Figure 8:
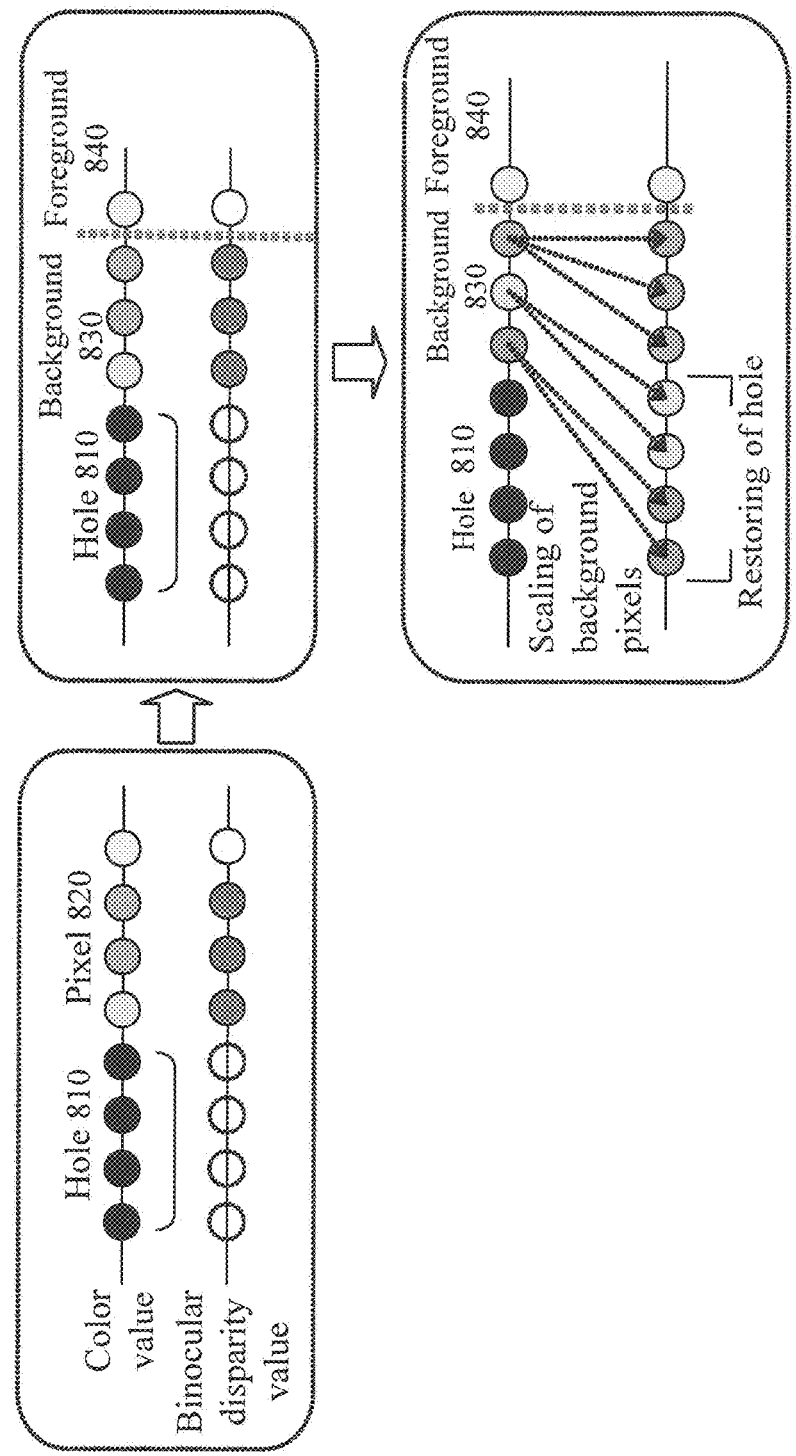
FIG. 8 illustrates a diagram of scaling of neighboring pixels using background pixels according to example embodiments.

FIG. 8 illustrates a diagram illustrating scaling of neighboring pixels using background pixels according to example embodiments.

The neighboring pixel scaling-based hole restoration unit 350 may select a same number of pixels 820 as a number of consecutive hole pixels 810.

Each of the selected pixels 820 may have a binocular disparity value.

The neighboring pixel scaling-based hole restoration unit 350 may classify each of the selected pixels 820 into a foreground pixel and a background pixel, based on the binocular disparity value.

For example, the neighboring pixel scaling-based hole restoration unit 350 may classify, as a foreground pixel, a pixel having a binocular disparity value greater than a threshold defined in advance, and may classify, as a background pixel, a pixel having a binocular disparity value that is equal to or less than the threshold, among the selected pixels 820.

Referring to FIG. 8, three pixels 830 among the selected pixels 820 may be classified as background pixels, and a pixel 840 may be classified as a foreground pixel.

The neighboring pixel scaling-based hole restoration unit 350 may restore the hole by scaling the background pixels 830 towards the hole pixels 810.

Here, a number of the pixels 830 may be less than a number of hole pixel 810. Accordingly, a portion or all of the pixels 830 may be scaled to more than two pixels. Additionally, pixel 840 may be unevenly scaled.

Pixel 840 may not be scaled and accordingly, it is possible to prevent a foreground image from being modified due to scaling.

The above-described scaling methods may enable extension of the pixels 740 or 830 only in a horizontal direction, in which FIG. 7 is a scan direction. Accordingly, the scaling methods may be easily implemented. Additionally, when the scaling methods are used, a significant degradation in the image quality may not be recognized even though a hole having a small size is restored.

Figure 9:
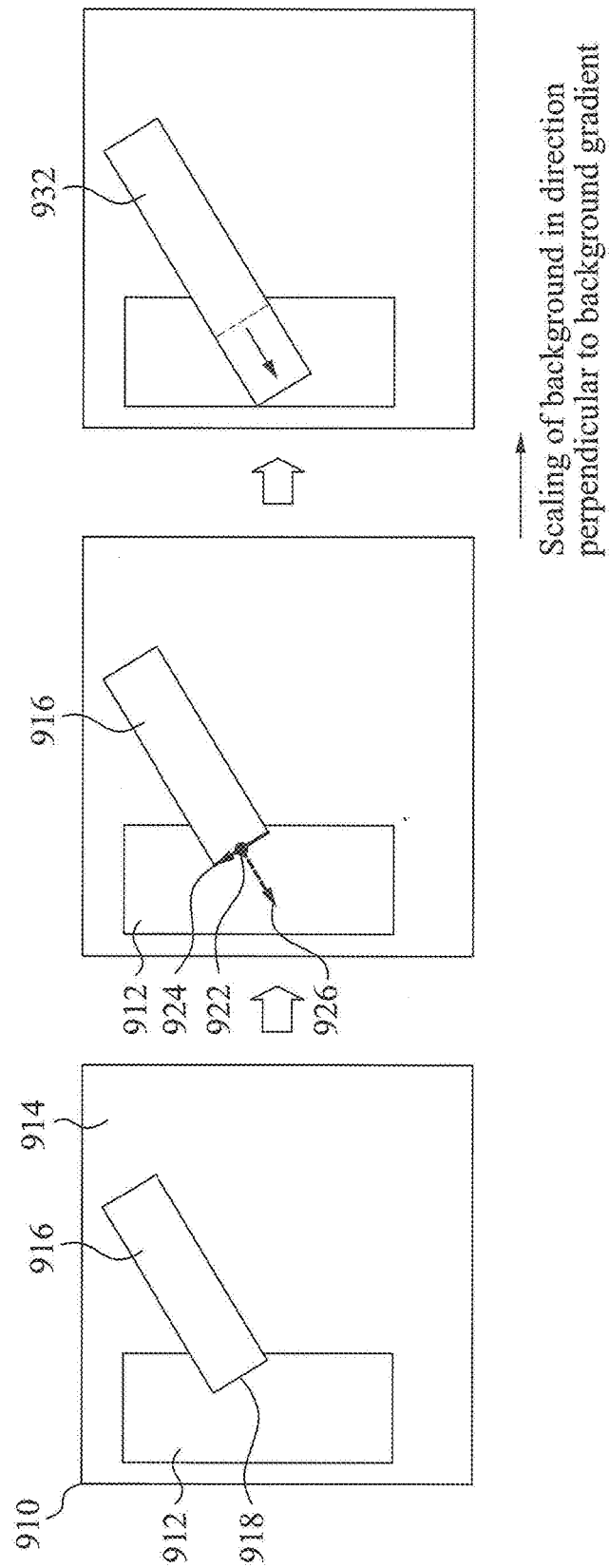
FIG. 9 illustrates a diagram of scaling performed in a direction perpendicular to a gradient of a background according to example embodiments.

FIG. 9 illustrates a diagram of scaling performed in a direction perpendicular to a gradient of a background according to example embodiments.

In FIG. 9, an output view image 910 may include a hole 912.

When a shape 916 appears on a background 914 and scaling is performed in the horizontal direction, the shape 916 may not be well preserved.

Accordingly, the shape 916 needs to be scaled in a direction 926 perpendicular to a direction 924 of an edge 918 of the shape 916. Here, the edge 918 may be included in the hole 912.

The neighboring pixel scaling-based hole restoration unit 350 may select a background pixel 922 adjacent to the hole 912.

The neighboring pixel scaling-based hole restoration unit 350 may calculate a gradient of the edge 918 including the background pixel 922. The gradient of the edge 918 may be a gradient of the background pixel 922.

The neighboring pixel scaling-based hole restoration unit 350 may detect a number of consecutive hole pixels in a direction perpendicular to the gradient of the edge 918.

The neighboring pixel scaling-based hole restoration unit 350 may scale background pixels in the direction perpendicular to the gradient of the edge 918, so that the detected hole pixels may be restored.

In other words, the neighboring pixel scaling-based hole restoration unit 350 may restore a hole by scaling the background pixels or a portion of a background in a direction perpendicular to a gradient of the background pixel 922 adjacent to the hole 912. The background pixels may include the background pixel 922 adjacent to the hole 912. The background pixels may denote the shape 916 that includes the background pixel 922.

Here, the neighboring pixel scaling-based hole restoration unit 350 may detect the number of consecutive hole pixels in the direction perpendicular to the gradient of the background pixel 922, may determine background pixels to be used for scaling based on the detected number of consecutive hole pixels, and may determine how many pixels the background will be scaled to.

The neighboring pixel scaling-based hole restoration unit 350 may restore the hole while maintaining a directivity of background pixels (for example, shape 916), by performing scaling in the direction perpendicular to the gradient of the background pixel 922.

In the scaling method using a gradient of a background, background pixels may be scaled in a direction perpendicular to an edge and accordingly, it is possible to achieve a more natural result than a scaling method performed in a horizontal direction. The scaling method using the gradient of the background, however, may need to perform a relatively more complex operation.

Figure 10:
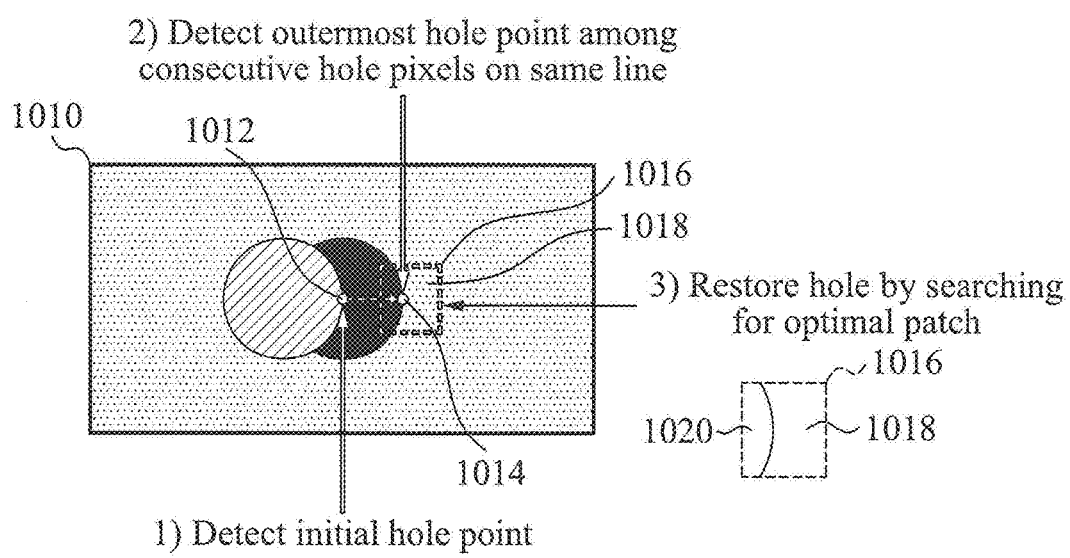
FIG. 10 illustrates a diagram of an optimal patch search-based hole restoration according to example embodiments.

FIG. 10 illustrates a diagram of an optimal patch search-based hole restoration according to example embodiments.

In FIG. 10, an output view image 1010 may include a hole.

When a background region adjacent to the hole is a texture region, then the hole may not be accurately restored merely by scaling background pixels.

If the background region adjacent to the hole is a texture, then a patch that is most similar to the background region adjacent to the hole may be detected from all background regions. The detected patch may be used to restore the hole. In other words, when the same texture or a texture similar to the texture included in the background region adjacent to the hole is detected from another background region, a portion adjacent to the other background region may be used to restore the hole.

First, a scheme of determining a point to be restored using a patch may be described.

A scheme of first processing a hole adjacent to a background may be used. A scheme of restoring regions of a hole in a sequence from a region of the hole adjacent to the background may be used and accordingly, mixing of foreground pixels may be limited in structure during hole restoration.

The optimal patch search-based hole restoration unit 360 may detect hole pixels in a raster-scan direction.

A detected initial hole point 1012 may be adjacent to a foreground. Accordingly, the initial hole point 1012 may be unsuitable for being restored first.

The optimal patch search-based hole restoration unit 360 may detect consecutive hole pixels from the initial hole point 1012 in the raster-scan direction.

The optimal patch search-based hole restoration unit 360 may set an end of the consecutive hole pixels as an outermost hole point 1014. The outermost hole point 1014 may be adjacent to a background. Accordingly, a color value and a binocular disparity value of a pixel that is not a hole and is adjacent to the outermost hole point 1014 may be used to search for a patch for restoring a hole region around the outermost hole point 1014.

The optimal patch search-based hole restoration unit 360 may perform an optimal patch search-based hole restoration with respect to the outermost hole point 1014. Hereinafter, the optimal patch search-based hole restoration will be further described.

The optimal patch search-based hole restoration unit 360 may set, as a window region 1016, a region adjacent to the outermost hole point 1014. The window region 1016 may include N×N pixels.

The window region 1016 may include a background region 1018 and a hole region 1020. The background region 1018 may be used to search for a patch. The hole region 1020 may be restored using the found patch.

The optimal patch search-based hole restoration unit 360 may detect an optimal patch corresponding to the window region 1016 from all background regions, and may restore the outermost hole point 1014 and the hole region 1020 using the detected patch.

The optimal patch may refer to a region that is most similar to the window region 1016.

The optimal patch may have the same size as the window region 1016. The patch may also include a portion corresponding to the background region 1018 and a portion corresponding to the hole region 1020.

A similarity between a patch and the window region 1016 may be calculated. The patch may have the same size as the window region 1016, and may include a portion corresponding to the background region 1018 and a portion corresponding to the hole region 1020.

When the similarity is calculated, only the background region 1018 may be used, not the hole region 1020.

For example, when a part of a patch corresponding to the background region 1018 has the same color value and binocular disparity value as those of the background region 1018, the patch may be regarded to be identical to the background region 1018. Accordingly, the patch may be selected as an optimal patch.

The optimal patch search-based hole restoration unit 360 may use a mean of absolute difference (MAD) scheme, to calculate the similarity. The MAD scheme may be performed using a color value and a binocular disparity value.

When a MAD between the window region 1016 and a particular patch among a plurality of patches has a minimum value, the optimal patch search-based hole restoration unit 360 may select the particular patch as an optimal patch.

When the optimal patch is determined, the optimal patch search-based hole restoration unit 360 may restore the hole region 1020 using a portion of the determined patch that corresponds to the hole region 1020.

Figure 11:
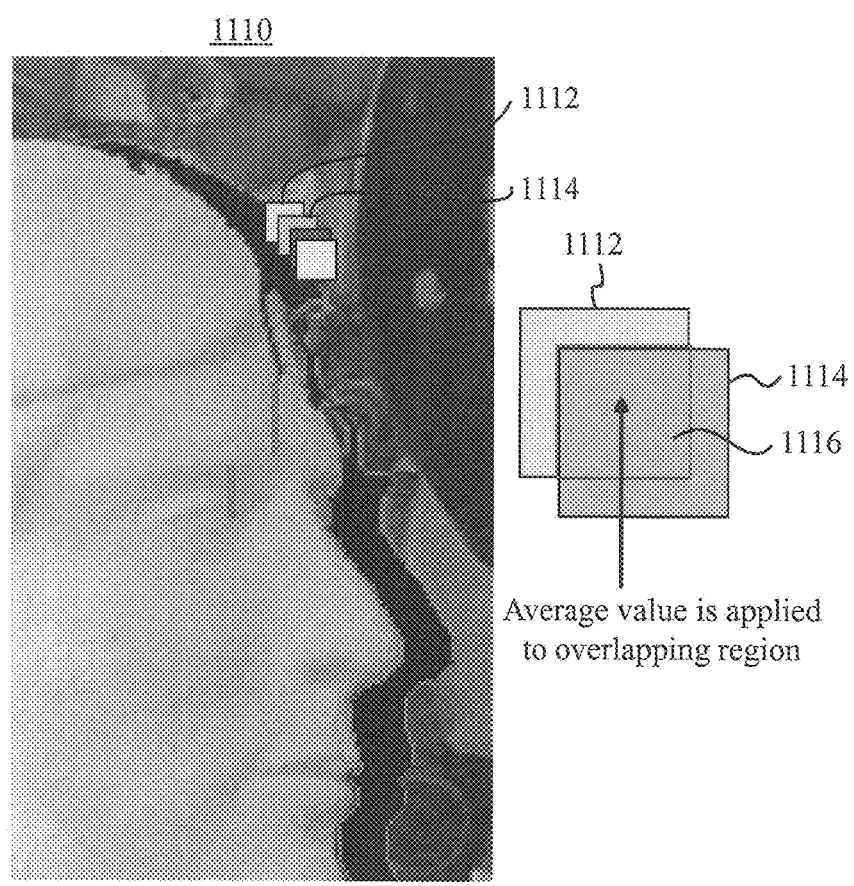
FIG. 11 illustrates a diagram of a restoration of a hole using overlapping of a patch according to example embodiments.

FIG. 11 illustrates a diagram of a restoration of a hole using overlapping of a patch according to example embodiments.

The optimal patch search-based hole restoration unit 360 may use at least two patches to restore a predetermined hole pixel (or hole region).

Specifically, the optimal patch search-based hole restoration unit 360 may select at least two window regions 1112 and 1114, based on two different outermost hole points.

The optimal patch search-based hole restoration unit 360 may search for an optimal patch for each of the window regions 1112 and 1114, and may restore the hole using the found patches.

When the two window regions 1112 and 1114 overlap each other, an overlapping hole region may be restored by the two patches.

Here, the optimal patch search-based hole restoration unit 360 may restore the overlapping hole region using an average value of color values of the two patches, and an average value of binocular disparity values of the at least two patches. Of course, more than two patches may be used to restore a hole region and the overlapping hole region may be restored using the average values of the overlapping patches.

Figure 12:
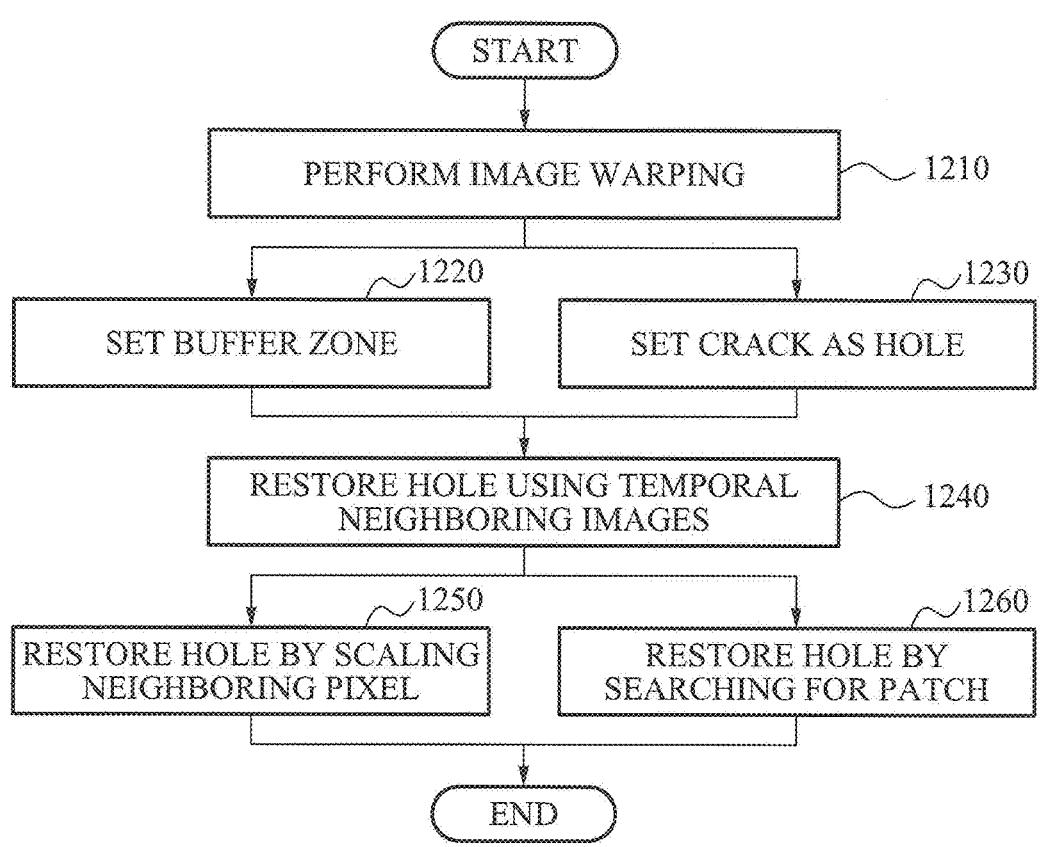
FIG. 12 illustrates a flowchart of an image processing method according to example embodiments.

FIG. 12 illustrates a flowchart of an image processing method according to example embodiments.

In operation 1210, an output view image may be generated, for example by image warping using a reference view image and binocular disparity information of the reference view image.

In operation 1220, a buffer zone may be set, so that a hole generated in the output view image may be expanded.

In operation 1230, a crack in the output view image may be set as a hole.

In operation 1240, the hole may be restored using one or more temporally neighboring images. Here, the temporally neighboring images may be temporally adjacent to the reference view image or the output view image.

In operation 1250, the hole may be restored by scaling at least one neighboring pixel adjacent to the hole.

In operation 1260, the hole may be restored by searching for a patch from a background, and using the found patch. Here, the patch may be most similar to a region including the hole.

Technical information described above with reference to FIGS. 1 to 11 may equally be applied to example embodiments of the image processing method of FIG. 12 and accordingly, further descriptions thereof will be omitted.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the image processing apparatus described herein.

Figure 13:
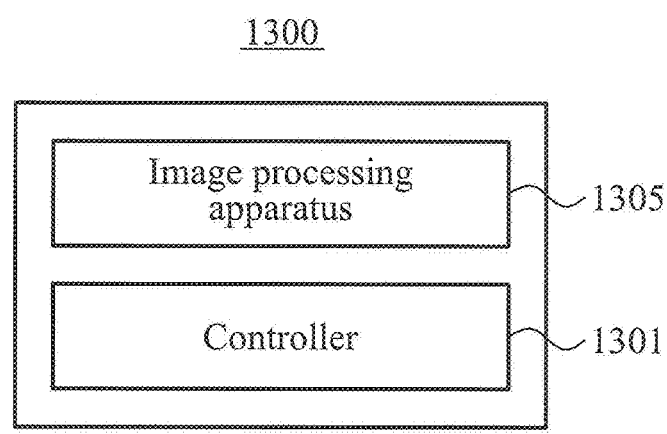
FIG. 13 illustrates a display device including an image processing apparatus according to example embodiments.

FIG. 13 illustrates a display device including an image processing apparatus according to example embodiments.

Referring to FIG. 13, the display device such as multi-view display device 1300 may include, for example, a controller 1301 and an image processing apparatus 1305.

The multi-view display device 1300 may be in the form of a 3D display for displaying a 3D image and may employ a multi-view scheme to output three or more different viewpoints. Alternatively, the multi-view display device 1300 may be in the form of a stereoscopic display outputting a left and right image.

The controller 1301 may generate one or more control signals to control the multi-view display device 1300 or may generate one or more signals to be displayed by the multi-view display device 1300, or both. The controller 1301 may include one or more processors.

The image processing apparatus 1305 may be used to generate a multi-view image for the multi-view display device 1300 and may include, for example, any one or more of an image warping unit, a buffer zone setting unit, a binocular disparity crack detection unit, a neighboring image-based hole restoration unit, a neighboring pixel scaling-based hole restoration unit, and an optimal patch search-based hole restoration unit. None of the preceding units are illustrated in FIG. 13. However, each of these units may correspond to similarly named units discussed herein, for example with respect to FIG. 3, and therefore need not be discussed further here.

The image processing apparatus 1305 may be installed internally within the multi-view display device 1300, may be attached to the multi-view display device 1300, or may be separately embodied from the multi-view display device 1300. Regardless of its physical configuration, the image processing apparatus 1305 has all of the capabilities discussed herein, such as with respect to FIGS. 1-11. The image processing apparatus 1305 may include one or more internal processors or the one or more processors may be included within the multi-view display device 1300 such as the one or more processors of controller 1301.

The 3D image apparatuses and methods described here may utilize a variety of video formats including but not limited to H.264/MPEG-4 AVC, High Efficiency Video Coding (HEVC), Dirac video compression format, VC-1, and the like.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. An image processing apparatus, comprising:
at least one processor; and
a memory having instructions stored thereon executed by the at least one processor to perform:
generating an output view image by image warping based on a reference view image and binocular disparity information of the reference view image;
expanding a hole generated in the output view image by regarding a buffer region adjacent to the hole as the hole, wherein pixels having a distance from an outermost pixel of the hole that is less than a threshold are set as the buffer region; and
a neighboring image-based hole restoration processor configured to restore the hole using one or more temporally neighboring images adjacent to the reference view image or the output view image,
wherein the restoring comprises:
restoring a color value of a pixel in the hole, using color values of pixels included in the one or more temporally neighboring images and corresponding to the pixel in the hole, and binocular disparity values of the pixels included in the one or more temporally neighboring images are less than a threshold; and
restoring the color value of the pixel in the hole, using a color value of a first pixel in the buffer region when the pixel is included in the buffer region of the output view image.

2. The image processing apparatus of claim 1, wherein the one or more temporally neighboring images are temporally adjacent to the reference view image.

3. The image processing apparatus of claim 1, wherein the one or more temporally neighboring images are temporally adjacent to the output view image.

4. The image processing apparatus of claim 1, wherein, when all of the reference view image and the temporally neighboring images are moved over time, the restoring further comprises selecting the pixels corresponding to the pixel in the hole from the temporally neighboring images, based on a movement of the reference view image and the temporally neighboring images.

5. The image processing apparatus of claim 1, wherein the restoring the color value of the pixel in the hole restores the color value of the pixel in the hole, by excluding one or more hole pixels, corresponding to the pixel in the hole, in the temporally neighboring images.

6. The image processing apparatus of claim 1, wherein the restoring the color of the pixel in the hole comprises restoring the color value of the pixel in the hole, using one or more background pixels among pixels corresponding to the pixel in the hole.

7. The image processing apparatus of claim 1, wherein the instructions further performs:
setting a crack in the output view image as the hole.

8. The image processing apparatus of claim 7, wherein the setting the crack in the output view image as the hole comprises detecting a pixel in the output view image as the crack when a total sum of differences in a binocular disparity value between the pixel and neighboring pixels in the output view image is greater than a predetermined value.

9. An image processing method, comprising:
generating an output view image by image warping based on a reference view image, and binocular disparity information of the reference view image;
expanding a hole generated in the output view image by regarding a buffer region adjacent to the hole as the hole, wherein pixels having a distance from an outermost pixel of the hole that is less than a threshold are set as the buffer region; and
restoring the hole using one or more temporally neighboring images adjacent to the reference view image or the output view image,
wherein the restoring of the hole comprises
restoring a color value of a pixel in the hole, using color values of pixels included in the one or more temporally neighboring images and corresponding to the pixel in the hole, and binocular disparity values of the pixels included in the one or more temporally neighboring images are less than a threshold; and restoring the color value of the pixel in the hole, using a color value of a first pixel in the buffer region when the pixel is included in the buffer region of the output view image.

10. The image processing method of claim 9, wherein the one or more temporally neighboring images are temporally adjacent to the reference view image.

11. The image processing method of claim 9, wherein the one or more temporally neighboring images are temporally adjacent to the output view image.

12. The image processing method of claim 9, further comprising:

setting a crack in the output view image as the hole.

13. The image processing method of claim 9, further comprising:

restoring the hole by scaling at least one pixel, the at least one pixel being adjacent to hole; and restoring the hole by searching for a patch from a background, and using the found patch, the patch being most similar to a region including the hole.

14. A non-transitory computer readable recording medium storing a program to cause a computer to implement the method of claim 9.

15. An apparatus for generating multi-views, the apparatus comprising:

at least one processor; and a memory having instructions stored thereon executed by the at least one processor to perform:

generating an output view image based on a reference view image and binocular disparity information of the reference view image;

expanding a hole generated in the output view image by regarding a buffer region adjacent to the hole as the hole, wherein pixels having a distance from an outermost pixel of the hole that is less than a threshold are set as the buffer region; and restoring the hole using background information of one or more temporally neighboring images adjacent to the reference view image or the output view image, the hole being generated as a result of the generating of the output view image, wherein the restoring comprises:

restore a pixel in the hole, using color values of pixels included in the one or more temporally neighboring images and corresponding to the pixel in the hole, and binocular disparity values of the pixels included in the one or more temporally neighboring images are less than a threshold; and restoring the color value of the pixel in the hole, using a color value of a first pixel in the buffer region when the pixel is included in the buffer region of the output view image.

16. The apparatus of claim 15, wherein the one or more temporally neighboring images are temporally adjacent to the reference view image.

17. The apparatus of claim 15, wherein the one or more temporally neighboring images are temporally adjacent to the output view image.

18. The apparatus of claim 15, wherein the generating the output view image generates the output view image by interpolating or extrapolating data from the reference view.

19. A display device comprising:

at least one processor; and a memory having instructions stored thereon executed by the at least one processor to perform:

generating an output view image based on a reference view image and binocular disparity information of the reference view image;

expanding a hole generated in the output view image by regarding a buffer region adjacent to the hole as the hole, wherein pixels having a distance from an outermost pixel of the hole that is less than a threshold are set as the buffer region;

a neighboring image-based hole restoration processor configured to restore the hole using one or more temporally neighboring images adjacent to the reference view image or the output view image, the hole being generated by the generating of the output view image; and generating a signal to be displayed by a display device based on the generated output view image having the hole restored, wherein the restoring comprises:

restoring a color value of a pixel in the hole, using color values of pixels included in the one or more temporally neighboring images and corresponding to the pixel in the hole, and binocular disparity values of the pixels included in the one or more temporally neighboring images are less than a threshold; and restoring the color value of the pixel in the hole, using a color value of a first pixel in the buffer region when the pixel is included in the buffer region of the output view image.

20. The display device of claim 19, wherein the one or more temporally neighboring images are temporally adjacent to the reference view image.

21. The display device of claim 19, wherein the one or more temporally neighboring images are temporally adjacent to the output view image.

* * * * *